United States Patent
Berg et al.

(10) Patent No.: US 7,895,167 B2
(45) Date of Patent: Feb. 22, 2011

(54) SYSTEM AND METHOD FOR ANALYSIS AND MANAGEMENT OF LOGS AND EVENTS

(75) Inventors: Gal Berg, Tel-Aviv (IL); Haim Koschitzky, Kfar-Truman (IL); Amir Saguy, Tel-Aviv (IL); Omry Koschitzky, Kfar-Truman (IL)

(73) Assignee: XpoLog Ltd., Kfar-Truman (IL)

( * ) Notice: Subject to any disclaimer, the term of this patent is extended or adjusted under 35 U.S.C. 154(b) by 11 days.

(21) Appl. No.: 11/354,930

(22) Filed: Feb. 16, 2006

(65) Prior Publication Data

US 2006/0184529 A1 Aug. 17, 2006

Related U.S. Application Data

(60) Provisional application No. 60/653,136, filed on Feb. 16, 2005.

(51) Int. Cl.
*G06F 7/00* (2006.01)
(52) U.S. Cl. .................................................. 707/672
(58) Field of Classification Search ................. 707/672
See application file for complete search history.

(56) References Cited

U.S. PATENT DOCUMENTS

| | | | |
|---|---|---|---|
| 5,847,972 A | 12/1998 | Eick et al. | |
| 6,173,418 B1 | 1/2001 | Fujino et al. | |
| 6,278,993 B1 * | 8/2001 | Kumar et al. | 707/3 |
| 2003/0055809 A1 * | 3/2003 | Bhat | 707/1 |
| 2004/0243568 A1 * | 12/2004 | Wang et al. | 707/3 |
| 2004/0254919 A1 * | 12/2004 | Giuseppini | 707/3 |
| 2005/0015624 A1 * | 1/2005 | Ginter et al. | 713/201 |
| 2005/0210016 A1 * | 9/2005 | Brunecky | 707/3 |
| 2006/0168569 A1 * | 7/2006 | Smith et al. | 717/124 |

* cited by examiner

*Primary Examiner*—Pierre M Vital
*Assistant Examiner*—Truong V Vo

(57) ABSTRACT

A log record analyzing system for monitoring log records from at least one computerized system. The log record analyzing system comprises a pattern repository that stores a plurality of pattern object records of different grammar types and a parsing engine which is adapted to receive a raw log data input. The parsing engine facilitates the matching between the raw log data input and at least one of the pattern object records. The parsing engine outputs parsed data according to the matching.

18 Claims, 13 Drawing Sheets

SYSTEM AND METHOD FOR ANALYSIS AND MANAGEMENT OF LOGS AND EVENTS

RELATED APPLICATIONS

The present application claims priority from U.S. Provisional Patent Application No. 60/653,136, filed on Feb. 16, 2005, the contents of which are hereby incorporated by reference.

FIELD AND BACKGROUND OF THE INVENTION

The present invention relates to a system and method for analysis and management of logs and events and, more particularly but not exclusively, to a log record analyzing system for monitoring log records from different computerized systems, searching apparatus for searching specific entries in log data and a method for monitoring.

During the last decade, many procedures which were done in the past by man are now done by computerized systems and devices. Information Technologies (IT) has become an integral element in almost any organization.

Today, central servers, data storage, digital recording devices and communication networks are fundamental elements of the infrastructure of almost any big organization that integrates IT systems. Hence, loss of such information technology functions can cause any company to plunge into operational disarray, triggering revenue losses and negative publicity that may take years to overcome.

In order to avoid the loss of such information technology many companies employ a maintenance team that constantly supervises and administers the integrity of the computerized systems of the organization.

One approach to supervise and administer the functioning of computerized systems, inter alia, computerized systems of an organization, is to install a software module or designated hardware that produces record files that summarize the activity of the computerized systems.

The record files, also known as log files, are usually used for statistical purposes as well as backup and recovery. Moreover, log files can be used to probe whether the computerized system is utilized in an efficient manner.

Log files are usually written by the Operating System (OS) or other control program for such purposes as recording incoming dialog, error, status messages and certain transaction details. The initiation of the ending of routine action may also be recorded in log files. Log files are also generated by different independent applications.

An application may generate a log file that the user can refer to during the maintenance procedures or in the event of a failure. For example, an FTP program may generate a log file showing the date, time and source and destination paths for each file transferred and may store that log file in the source directory.

Log files can also be used for statistical analysis. Since log files may comprise documentation of the operation of routines during a specific time period, the documentation can be analyzed to determine the causes of errors or malfunctions.

Moreover, statistical analysis of the log files can be performed to determine certain probed behavior of users. One example is a log file of web servers. The web server's log files may be configured to list every request made to the server. With log files as an analysis tool, it is possible to determine the location of the site's visitors, how often visitors enter the site, and how they navigate through a site. Using cookies enables Webmasters to log even more detailed information about how individual users access a site.

Unlike other files that contain text or documentation information, the size of log files may be several gigabytes or even several hundreds of gigabytes. Scanning such log files can require a substantial amount of time by the system's maintenance team.

Moreover, usually large organizations make use of more than one computerized system that produces log files. The numerous computerized systems demand that the maintenance teams survey myriad log files. The greater the number of log files and the greater the size of each log file, the longer are the troubleshooting periods of problems, testing and maintenance procedures. The number of log files that the maintenance team has to survey every given time period critically affects the crucial Mean Time to Repair (MTTR) factor.

In order to facilitate easier administration of a plurality of computerized systems, it is desirable to gather data logs. However, few systems for gathering data logs are known.

U.S. Pat. No. 6,173,418, issued on Jan. 9, 2001, discloses a device for gathering log data. The disclosed device even combines a device for normalizing the log data by cutting out values corresponding to pre-defined data items from computer log files, and for storing the normalized log data.

Such a device facilitates the monitoring of computerized systems by collecting log files and, based thereupon, outputting one log data analysis file that presents all the data logs together after they have been normalized.

However, such a device can analyze log files from only a limited number of sources. The device can analyze only log files which comprise a predetermined grammar which corresponds to the device.

Moreover, normalizing the log files is not sufficient to substantially reduce the maintenance time since the maintenance team still has to scan all the normalized data. In addition, the device according to U.S. Pat. No. 6,173,418 cannot analyze or normalize log messages or events which are not documented in the probed log files.

Another problem with data log files is that some computerized systems and devices output log files which are accessible only through the local file system. Each log file may be accessible through a different protocol, such as FTP, SSH or HTTP.

U.S. Pat. No. 5,847,972, issued on Dec. 8, 1998, discloses a technique for interactively analyzing system log files. The patent discloses a method for analyzing system log file outputs which are monitored by technical personnel and systems specialists to determine system performance, status, and software faults. Each log file contains time stamp reports. Using this technique, reports are correlated, faults are isolated, and temporal patterns are recognized by using conventional, non-graphical techniques.

However, this method does not indicate the origin of different log files. In addition, the method enables the system operator and administrator only to monitor a device or a computerized system that outputs a log file with correlated grammar at a predetermined time interval.

There is thus a widely recognized need for a log record analyzing system and a method for monitoring a log record devoid of the above limitations.

SUMMARY OF THE INVENTION

According to one aspect of the present invention there is provided a log record analyzing system for monitoring a log record from at least one computerized system. The log record analyzing system comprising: a pattern repository adapted to store more than one pattern object record of different grammar types and a parsing engine associated with the pattern repository. The parsing engine comprises: a raw log data input for receiving raw log data, a matching unit associated with the input for matching between the raw log data input and one of the pattern object records, and an output for outputting a parsed structured version of the raw log data using a structure extracted from the matched record.

Preferably, The raw log data input of the log record analyzing system consists of at least one of the following members: textual log files, XML files, database files, communication information unit carriages, Java Message Service (JMS) packet files, and Enterprise Application Integration (EAI) packet files. The raw log data input consists of at least one of the following data types: semi-structured data, unstructured data, and structured data. The raw log data may comprise at least one of the following entries: multiple line entry and single line entry. The raw log data input may comprise a plurality of grammar types.

More preferably, the log record analyzing system further comprises a Complex Event Processing (CEP) module. The CEP module is adapted to receive raw log data from at least one computerized system, the CEP module being configured to forward the received raw log data to the parsing engine, wherein the forwarding is done according to a set of predetermined rules.

Preferably, the CEP module of the log record analyzing system is adapted to be connected to a user interface device, wherein the user interface device is adapted to transmit the set of predetermined rules to the CEP module.

More preferably, the log record analyzing system further comprises a parsed data viewer, wherein the parsed data viewer is adapted to receive the parsed data and wherein the viewer is adapted to graphically display the received parsed data.

More preferably, the log record analyzing system further comprises a log record builder, wherein the log record builder is adapted to receive the parsed structured data; wherein the log record builder is configured to output at least one resultant log record according to a set of predetermined rules, the output being based upon the raw log data input and the parsed structured data.

Another preferred embodiment of the present invention describes a searching apparatus for searching specific entries in raw log data from at least one computerized system. The searching apparatus comprising: an indexing module adapted to scan the raw log data and, based thereupon, to output indexed log data, the indexed log data comprising a plurality of term records and a plurality of corresponding position records, the position records reflecting the positions of terms in the raw log data. The searching apparatus further comprises an indexed log file repository operable for storing at least one of the indexed log data and a search module. The search module comprises an input for receiving a search query, an index search unit for searching the at least one indexed log data for records that match the search query, and an output to output a list of the matched records.

Another preferred embodiment of the present invention describes a pattern repository operable for storing at least one pattern object of different grammar patterns. The automatic pattern recognition module comprising an identification module adapted to identify the grammar of the raw log data input. The identification module comprises an input to receive at least a portion of the raw log data, and an output unit for outputting a pattern object record generated to represent the identified grammar, and to store the respective pattern object in the pattern repository. The automatic pattern recognition module further comprises a parsing engine comprising an input to receive a raw log data input, a matching unit to match between the raw log data input and at least one of the pattern object records and an output unit to output parsed data according to the matching.

Another preferred embodiment of the present invention describes a method for parsing log data with undefined grammar. The method comprises the following steps: a) storing more than one pattern object record of different grammar types, b) receiving at least a portion of raw log data input from at least one computerized system, c) identifying the delimiter of the portion of raw log data's grammar, d) using the delimiter for generating a new pattern object representing the grammar type of the log data, the new pattern object comprising a list of terms, and e) storing the new pattern object.

Another preferred embodiment of the present invention describes a method for monitoring computerized systems. This method comprises the following steps: a) storing more than one pattern object record of different grammar types, b) receiving raw log data input from at least one computerized system, c) matching the grammar type of the raw log data input with one of the pattern object record, d) parsing the raw log data input according the grammar type of the matched pattern object record, and e) outputting at least one unit of parsed data based upon the parsing.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
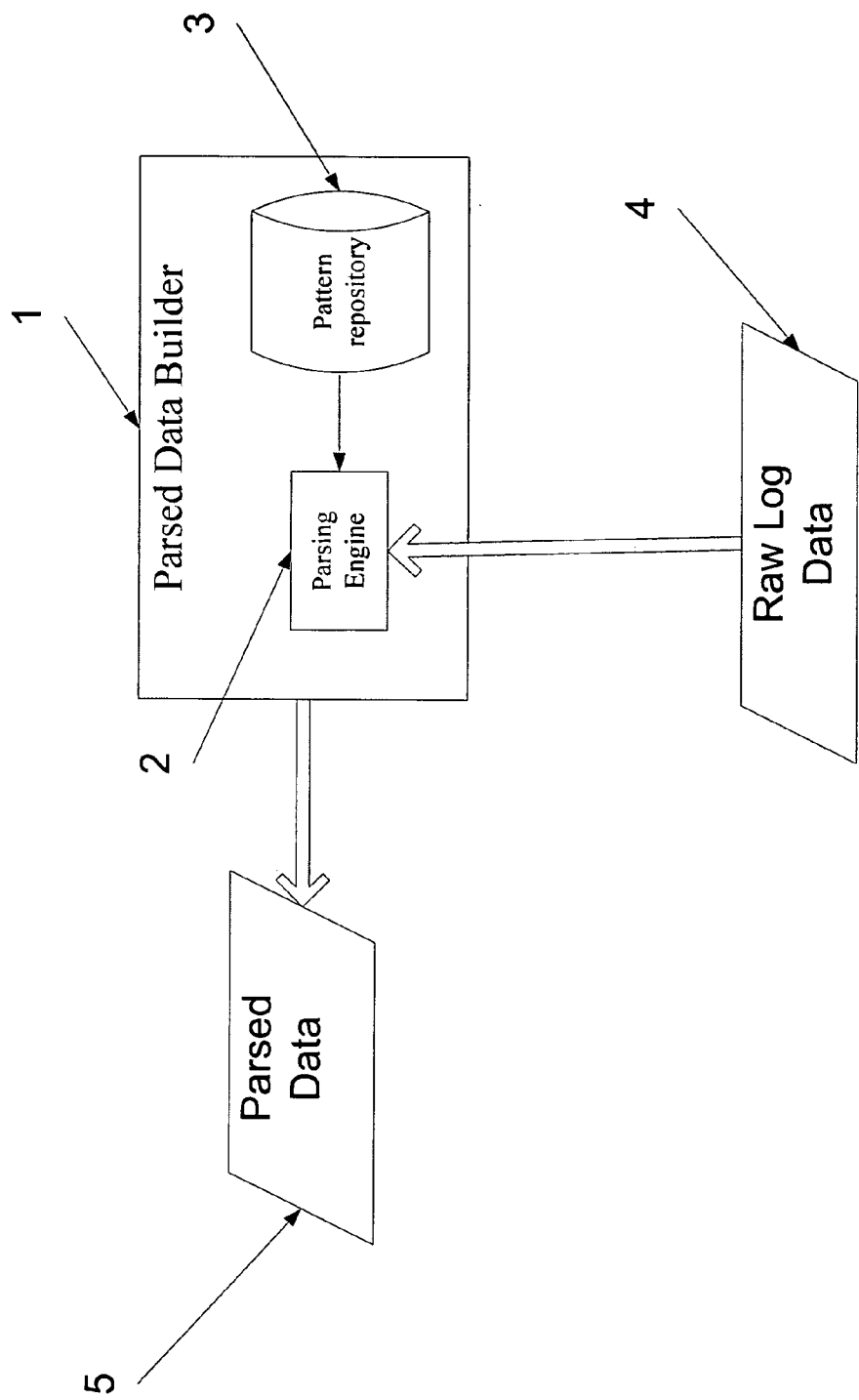
FIG. 1 is a schematic illustration of a system for monitoring log data from at least one computerized system according to a preferred embodiment of present invention.

The present embodiments comprise an apparatus and a method for monitoring and analyzing log files.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One preferred embodiment of the present invention is designed to provide tools for producing reliable structured data that represent gathered raw log data from different computerized system. The gathered raw log data may originate from various sources.

Usually, the raw log data comprises textual information from different log files. However, the raw log data can also originate from other data sources like binary data files, XML data files or protocol file data sources which are an extension of the file data source. In addition, the raw log data may comprise the information contained in messages such as a result set of Structured Query Language (SQL) queries or API messages.

Moreover, the textual data of the raw log data is not always stored in plain text format such as TXT files. The textual data can be represented in various log formats or other formats which are readable only when using specific protocols like FTP, SSH, HTTP, etc.

The raw log data input may be structured data, unstructured data or semi-structured data.

Structured data may be understood as any data whose composition corresponds to its atomic data type. Structured data is managed by technology that allows for querying and reporting based upon predetermined data types. In structured data the relationship between different data types is defined.

Unstructured data may be understood as any data stored in an unstructured format at an atomic level. That is, in the unstructured content, there is no conceptual definition and no data type definition. For example, in textual files each word is simply a word without a known relationship to the other words.

Semi-structured data may be understood as data that does not have a fixed format or fixed schema. Such a data structure lacks an explicit structure and is irregular in its format. For example, information integration, XML files or web pages are semi-structured data, having structured areas and unstructured areas.

Based upon unstructured data, semi-structured data and structured data the system, according to one preferred embodiment of the present invention, generates a report or a document that comprises structured data.

Hence, in order to facilitate the parsing of structured data the system first should identify the grammar and structure of each of the raw log data records. Based upon the identification, the system facilitates the transformation of the information to structured data having unified grammar.

Another preferred embodiment of the present invention is a search mechanism that facilitates the searching of specific records among the myriad lines of records from various log data sources. This searching mechanism comprises an indexing module that facilitates the creation of indexed log files. The indexed log files are utilized to enhance a rapid record search.

Another preferred embodiment of the present invention integrates an automatic pattern recognition mechanism. Using the automatic pattern recognition mechanism, the system can be used to parse log files with new and yet to be defined patterns and structures.

Reference is now made to FIG. 1 which depicts an exemplary system for monitoring log data from at least one computerized system, according to one embodiment of the present invention.

FIG. 1 depicts a parsed data builder 1 that comprises a pattern repository 3 and a parsing engine 2. The parsed data builder 1 receives input of raw log data 4 and outputs parsed data 5. As depicted in FIG. 1, the system comprises pattern repository 3 that stores patterns of different grammar types. The grammar types define patterns of log files or event messages in various formats and structures.

In use, the parsing engine 2 receives raw log data 4. The raw log data is a log comprised of data log entries. Usually, the raw log data 4 is created by computerized systems and updated every predetermined time interval. The log data can also be generated as an outcome of an examination process. Typically, the examination processes are either automatically preformed by the computerized systems as responses to certain events or as outcomes of the system operator instructions.

Frequently, raw log data 4 stores documentation of events. Various computerized systems comprise a data logging module that may automatically record events in a certain scope in order to provide a record that can be used to diagnose problems.

Examples of physical systems which have logging subsystems include process control systems and the black box recorders installed in real time systems. In addition, many operating systems and multitudinous computer programs include some form of logging subsystem.

Each data log entry of the raw log data 4 represents a different report or examination outcome. A data log entry is a unit of data that represents information, an action, an error or an event of the computerized system which produced it. Such a data log entry may be comprised of several different subentries.

For example, a data log entry may be comprised of one data log subentry that contains date and time information, another data log subentry that contains a host name and a third data log subentry that contains text that describes an event.

Other examples for subentries are: a subentry of textual information regarding the severity of a certain malfunction of the system, a subentry of the date and the time the entry is produced, a subentry of malfunction type or number, a subentry of the description of a certain system examination and the outcome of the examination, a subentry of the current status of a certain component of the system, a subentry of the occurrence of a certain thread, a subentry of an error report, etc.

Another known entry is an audit trail entry which is a record showing who has accessed a computer system and what operations he or she has performed during a given period of time.

The entry can be either a single line entry or a multiple-line entry. The parsing engine 2 facilitates the parsing of both kinds of entries. Hence, it is clear that different data log entries and data log subentries have different patterns and structures. Moreover, one raw log data entry may be comprised of data log entries with different patterns and different subentry patterns.

In use, the parsed data builder 1 scans at least a portion of the input raw log data 4 in order to identify the patterns of the entries and subentries that comprise the raw log data 4. The parsing engine 2 generates parsed structured data 5 according to the raw log data 4.

Initially, the raw log data 4 is matched with a grammar pattern record from the pattern repository 3. The pattern repository 3 comprises a comprehensive storage of grammar patterns of different types.

The raw log data 4 is comprised of an array of entries which has been generated according to predefined grammar rules. Since each entry of the raw log data 4 has to be matched and parsed, each of the raw log data entries should be matched with a record that represents a comparable pattern.

The pattern repository 3 comprises sets of records. Each set comprises entry pattern records that represent possible patterns of log entries. Each entry pattern record comprises a certain grammar pattern of a log entry which is associated with a certain array of characters to be parsed.

The raw log data 4 may be unstructured or semi-structured data. In addition, the log entries and subentries may be either single line or multiple lines. Accordingly, the log entries may have an irregular number of lines and may be positioned one after the other in a consecutive manner. Hence, since the boundaries of the entries are not clear, the parsing engine 2 cannot directly match each entry or subentry separately to the entry pattern records.

In order to identify the entry or subentry of the probed raw log data 4, the parsing engine 2, preferably, divides the raw log data 4 into blocks and the blocks into lines. Each line is probed separately. As described below, probing each line separately allows the parsing engine 2 to match the log lines to records that comprise grammar patterns. The parsing engine 2 matches a batch of logs in different combinations with records of the pattern repository 3.

As described above, some log entries comprise a number of subentries. The subentries may be only an optional supplemental section. Such a section reflects on the structure and pattern of the entry but does not add information that should be represented in the parsed structured data 5 or add information that should be represented only as an additional parsed text and not as a different entry. For example, entries may comprise an optional supplemental description section. The supplemental description section comprises a batch of text lines that describes the event or the message the entry specifies or documents. However, the batch of text lines that describes the event may be slightly changed according to different procedures of one of the computerized systems that generate the raw log data 4. In such cases, the parsing engine 2 should parse the same string of characters to represent all the entries which differ only in their optional supplemental section.

Preferably, in order to facilitate the matching of different entries of the log with the same entry pattern record from the pattern repository 3, some entry pattern records comprise optional supplemental sections. In order to match different entry pattern records with log entries that comprise optional supplemental sections, the different versions of the optional supplemental sections must be separately matched with the probed log entry.

Thus, if a certain probed log entry is matched with an entry pattern record that contains N versions of the optional supplemental section, then the number of possible different entry patterns is $2^n$ (there are $2^n$ subsets of a set containing N elements). Accordingly, each log entry must be matched with $2^n$ different versions.

Preferably, some entry pattern records comprise several optional supplemental sections. In this preferred embodiment, each log entry must be matched with the different combinations of all the possible versions.

Since the log entries that contain the optional supplemental sections or lack the optional supplemental sections are matched with the same record they are parsed according to the same pattern.

Preferably, the parsed pattern comprises a section that implies which optional section has been matched with the parsed record.

As described above, in one preferred embodiment of the present invention, the parsing engine 2 can parse different kinds of logs. Different logs have different subentries and entries. Hence a different set of entries must be stored in the pattern repository 3 to facilitate the parsing of different logs.

In one preferred embodiment, the possible patterns of entries of specific logs are stored in an entry pattern array. In order to facilitate the parsing of entries of different log types, the different entry pattern arrays are in a log pattern array. The aforementioned arrays are preferably stored in the pattern repository 3.

Each entry pattern array comprises various types of entries with different subentries, some with optional supplemental sections as described above.

In use, the parsing engine 2 receives a raw log data 4. Preferably, the raw log data 4 represents a log of a computerized system. Upon receiving the raw log data 4, the parsing engine 2 initiates a parsing log process.

However, since logs, inter alia, log files, can be substantially larger than the average size of a searchable file, the log should first be divided into smaller units. Accordingly, parsing engine 2 preferably initiates a parsing block sub-process and formats the log into blocks.

The parsing engine 2 initiates a parsing entry sub-process for the first block. Accordingly, the first block is matched with the first record of the log pattern array which is, as described above, an array of entries.

Since each block is part of the raw log data, each block comprises a batch of entries which are represented as a batch of consecutive lines, as mentioned before.

Figure 2:
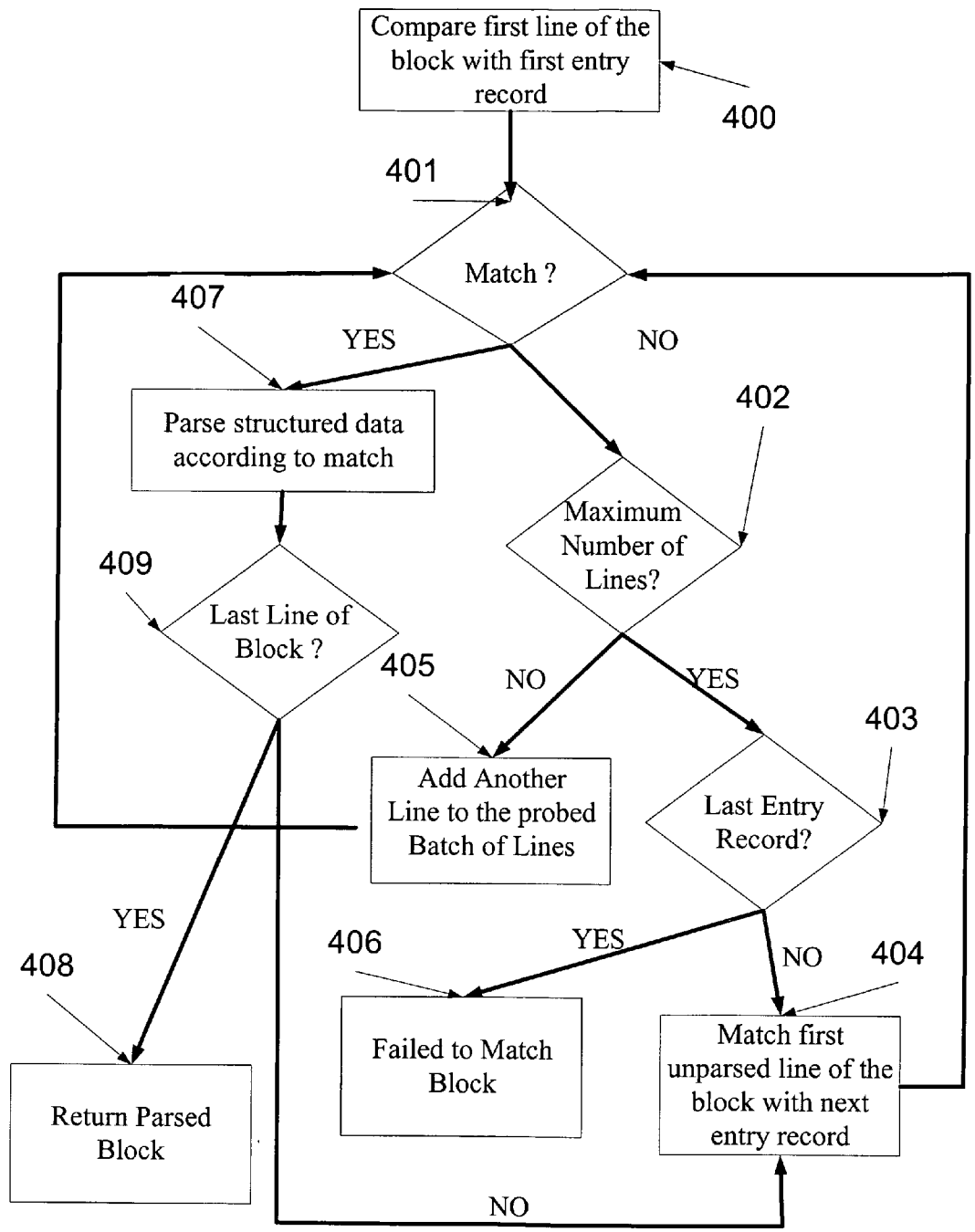
FIG. 2 is a flowchart of an entry parsing sub-process, according to one preferred embodiment of the present invention.

Reference is now made to FIG. 2, which is a flowchart that illustrates the entry parsing sub-process, according to one preferred embodiment of the present invention.

In order to parse the block entries and subentries, a parsing entry sub-process is initiated to identify each entry that comprises the block. During the parsing entry sub-process the first line of the block is separately compared with the first record of the subentry array, as shown at 400. If there is no match then the following line of the block is added to the first line and the two lines are compared together with the first record of the subentry array. Additional sequential lines are added to the probed batch of lines, one by one (the third line, the fourth line, etc.), as shown at 405. Each addition of a line to the probed batch of lines creates a new expanded batch which is compared with the same record of the subentry array, as shown at 401. Lines are added to the probed batch of lines until the maximum number of lines for a subentry is exceeded, as shown at 402, or until a match is achieved, as shown at 407. The addition of sequential lines can lead to three possible scenarios:

1. If the number of lines in the probed batch exceeded the maximum line number for an entry, as shown at 402, the same matching entry sub-process is redone with the following record of the entry array, as shown at 404. The first unparsed line and the unparsed lines which have been added to it are compared to the next record in the same manner that they are compared to the first record, at 401.

2. If the last record of the entry array is compared with the maximum line number for an entry and found unequal, as shown at 403, then the whole parsing block sub-process has failed, as shown at 406. The failure of the parsing block process leads to the deletion of the parsed data and to the initiation of a new matching process in which the probed block is compared with another set of entries that represent different log patterns as elaborated below.

3. If a match is achieved, as shown at 407, that means that the batch of lines which is probed comprises a certain entry of the probed log. Thus, the parsing engine can parse the structured data which is associated with the matched record of the entry array. Now another entry can be matched if there are still unparsed lines in the block, as shown at 409. Subsequently, a cyclic process is initiated, whereupon, during every cycle of the process, the sequential unmatched lines are matched in the same manner as the first line and the lines which have been added to it are matched, as shown at 404.

The parsing subentry sub-process is continued until the last entry of the block is matched, as shown at 408, or until the system has failed to match lines of the block to records of the entry array, as shown at 406.

Preferably, the redundant, unparsed lines of the probed block are added to the beginning of the following block.

Figure 3:
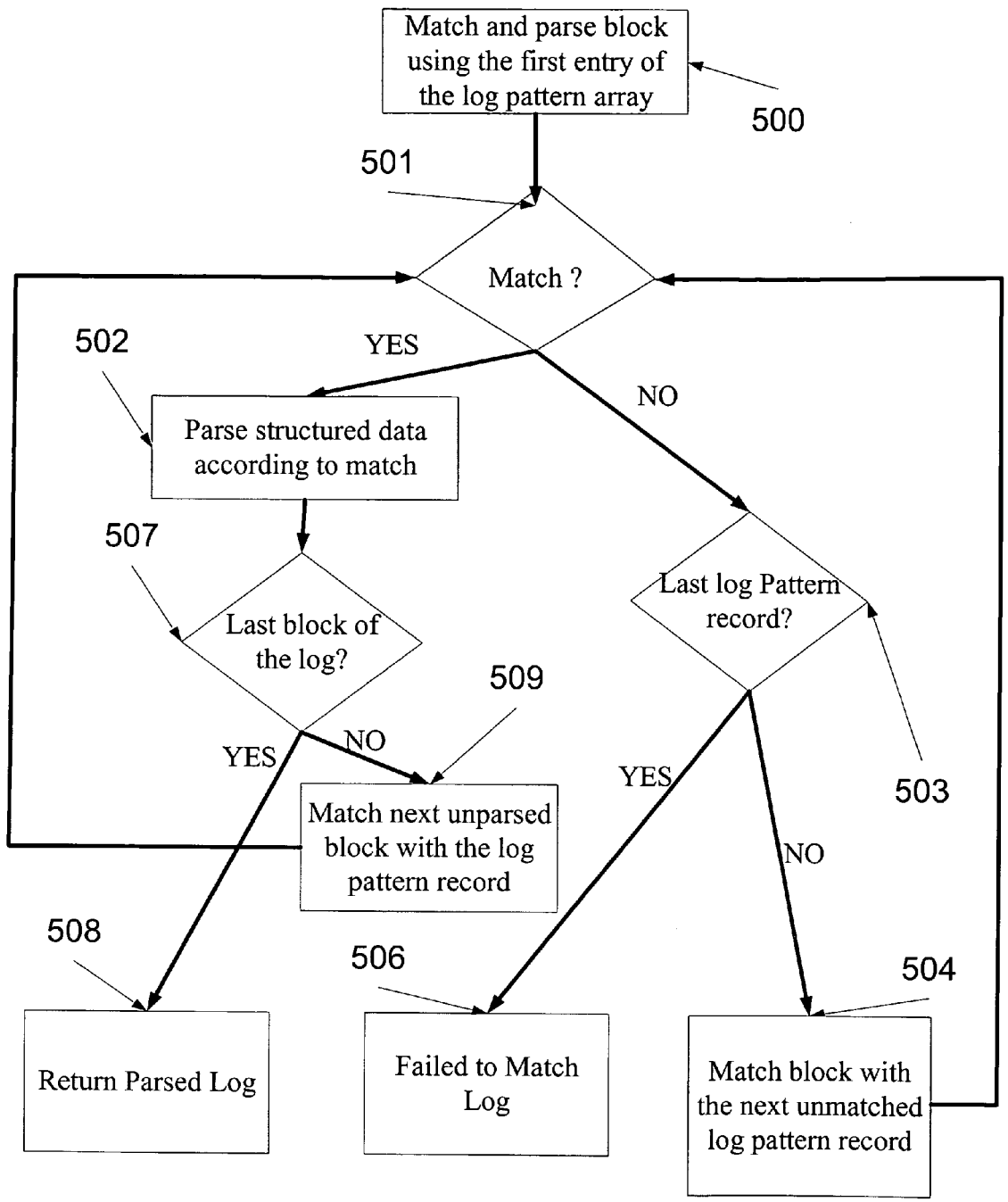
FIG. 3 is a flowchart of a block parsing sub-process, according to one preferred embodiment of the present invention.

Reference is now made to FIG. 3, which is a flowchart that illustrates the block parsing sub-process, according to one preferred embodiment of the present invention.

As described above, a block is compared with records of the log pattern array. The first iteration is to compare the first record of the log pattern array with the probed block, as shown at 500.

After the entry parsing sub-process has ended the block has either been parsed or has not been parsed.

If all the entries of the probed block have been matched and parsed, it is clear that the block is completely matched and parsed, as shown at 502. Hence, the entry parsing sub-process is reinitiated to identify each entry of the subsequent unparsed block, as shown at 509.

If one of the entries of the probed block has failed to be parsed, the probed block is then compared with the next record of the log pattern array, as shown at 504.

As described above, each record of the log pattern array comprises an entry array. Hence, by matching the block with the subsequent record of the array of log patterns, the block is being compared with a new set of entries that might better reflect the grammar which is used in the block and the pattern of the entries that comprises the block.

Subsequently, a cyclic process is initiated, wherein, during every cycle of the process, the sequential unmatched block is matched and parsed in the same manner that the first block has been matched.

The parsing block sub-process is continued until the last block of the log is matched and parsed, as shown at 508, or until the system has failed to match a block of the log to records of the array of log patterns, as shown at 506. In one preferred embodiment of the present invention the system is connected to a user interface that allows the operator of the system to have the ability to watch the parsed blocks and to input parsing instructions via a user interface. The user interface displays the parsed lines during the parsing process. When the block sub-process has finished parsing a block 502, the operator has the ability to send instructions that either request the parsing of the following block 509 or finalize the parsing procedure.

The raw log data may comprise more than one type of entry. Hence, entries of the same raw log data may be generated according to different grammar types.

Since, as described above, each block can be compared with different records of the array of log patterns, the parsed data builder 1 (FIG. 1) may parse logs which comprise more than one pattern.

Both the parsing block sub-process and the parsing sub-process are done in a non-intrusive manner and do not lock or change the raw log data.

Reference is now made, once again, to FIG. 1.

After the last block of the log has been matched and parsed accordingly, the parsing engine 2 outputs a structured data 5 that comprises an array of objects. Each object is a parsed entry which has been parsed during the course of the block parsing sub-process. Log entries which have been completely matched and parsed are added to the array of objects. Preferably, unparsed entries are added to the array of objects. For example, if an entry has failed parsing it may be added to the array of object to enable the operator to probe its content or even to identify the issue that led to the parsing failure.

Preferably, if the parsing engine has failed to parse a certain portion of the raw log data 4, the parsing engine 2 copies that portion of the raw log data 4 without parsing or changing it.

Preferably, the parsed data builder 1 outputs structured data as an array of objects and additional information. The additional information may be the source of the log entry or other information that is related to the aforementioned parsing process. The output array of objects may also be referred to here as a record log.

Figure 4:
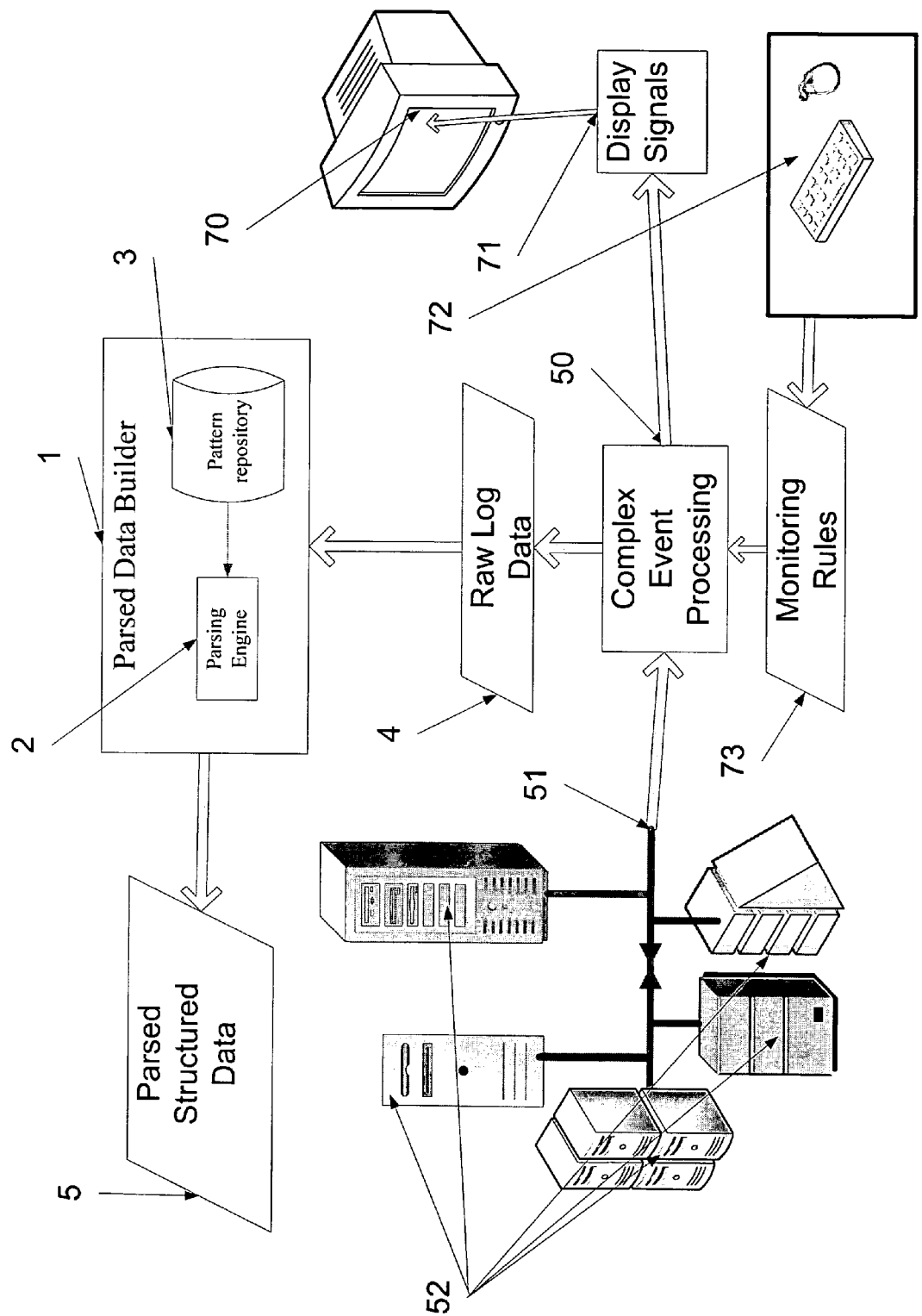
FIG. 4 is a schematic illustration of another simplified system for monitoring log data, according to a preferred embodiment of present invention. In this figure the system further comprises a Complex Event Processing engine.

Reference is now made to FIG. 4, which depicts another exemplary preferred embodiment of the present invention. The parsing engine 2, the raw log data 4, the parsed data 5 and the pattern repository 3 are as in FIG. 1 above. However, in the present embodiment, a complex event processing module 50 is added.

As described above, one advantage of the present invention is the ability to analyze and parse raw log data 4 from a large variety of data sources and computerized systems. The record analyzing system and the parsed data builder 1 may be used to receive raw log data from numerous computerized systems continuously.

FIG. 4 depicts a preferred embodiment of the present invention that integrates a Complex Event Processing (CEP) module 50. The CEP module 50 has the ability to be connected to a communication network and to access log files and event messages on different computerized systems. In addition, the CEP module 50 has the ability to receive packets of data which are delivered over the communication network. By doing so, the CEP module 50 connects the parsed data builder 1 to the communication network and facilitates analyzing of raw log data 4 from several sources 52.

The CEP module 50 can receive and access log files, XML files, DB and Enterprise Application Integration (EAI) bus messages and Java Message Service (JMS) API messages.

Preferably, the CEP module 50 is connected to an EAI bus 51. EAI bus and other inter-organization communication networks facilitate unrestricted sharing of data and business processes.

Software programs and databases of inventory, human resources, sales automation and database management which are connected to such an EAI bus can communicate and share data with each other across the EAI bus.

The CEP module 50 forwards the accessed and received raw log data 4 to the parsed data builder 1. Preferably, the CEP module 50 can be defined to access log files according to a set of predetermined rules and events 73. For example, a rule can define static or dynamic identifiers of different log data entries. Another rule can define the correlation of log data to an event or set of events. A rule may define a complex event structure that comprises several conditions that define a specific interconnection between several events. For example, the rule may define that only entries with a certain session ID should be recorded if another entry with the same session ID follows it. Rules may determine that only occurrence of a specific set of events may lead to the parsing of the entry. Rules can also be deterministic rules based upon characteristic of packets or computerized system outputs. A statistical rule can also be defined such as, for example, a rule that determines the percentage of the log file to be recorded according to its prevalence.

Preferably, the predetermined rules 73 are functions. A function can be comprised of a different number of constant or variable factors. The functions may be comprised of a combination of several conditions. Examples for constant factors are a predetermined range of dates or a quantitative threshold that defines the maximum or the minimum value of one of the variables of the entries of the semi-structured data or the structured data. Examples for variable factors are heuristic statistics or mathematical functions that combine several events.

As described above, the CEP module enables the system operator to clearly define which entries to parse. Instead of parsing the whole raw log data 4, the system operator may use the CEP module to define which specific transaction or process to parse. Hence, the CEP module may be used as a control tool that enables real time tracking on outputs of various computerized system. The CEP module may be configured to track complex transactions and processes which are not represented or documented by a specific entry but rather are identified according to a series of entries which originate from different computer systems. Accordingly, the CEP module may be used for documenting complex series of transactions or processes between several computerized systems. Such a transaction or process cannot be separately logged by one of the logging data modules of the computerized systems.

Preferably, an input device can be used to input monitoring instructions that define the predetermined set of aforementioned rules. A common mouse device and a common desktop keyboard 72 can be used as input devices, both connected to a computing unit which controls the display device 70, and can allow users to input monitoring rules and functions 73 and to make selections. Preferably, the rules and functions are defined in SQL format.

Preferably, the CEP module further comprises a CEP database. The CEP database is used to store the raw log data which is transferred to the parsed data builder 1. The stored raw log data can later be used to track and monitor transactions of data to the parsed data builder 1. In one preferred embodiment of the present invention the CEP module is further connected to a display device 70 that receives display signals 71 from the CEP module 50 and thus facilitates the display of the stored raw log data 4 and the aforementioned transactions. The display may include indications of the statuses of the different dimensions, such as time, topology, and data and a detailed view containing the original event messages.

Figure 5:
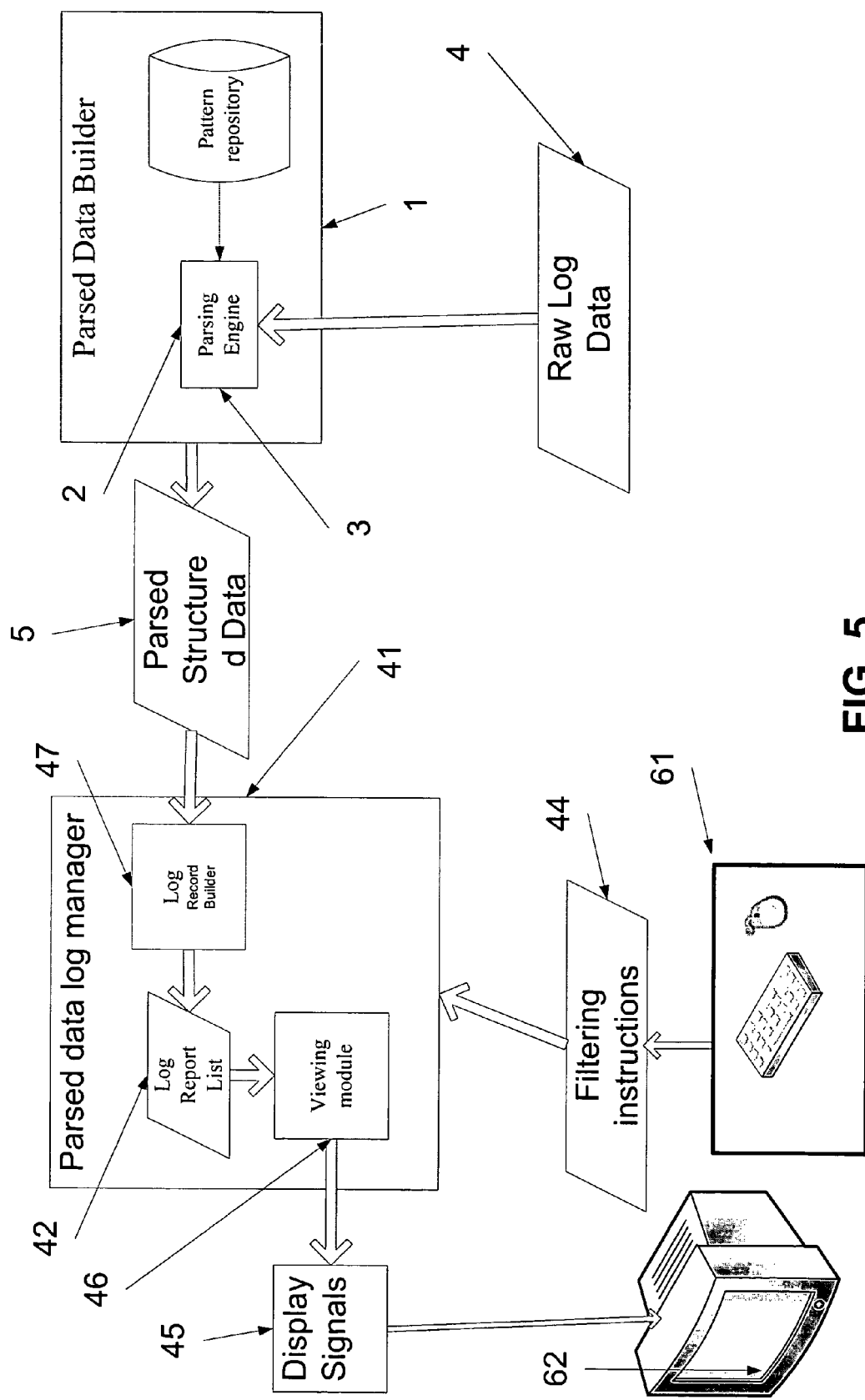
FIG. 5 is a schematic illustration of another simplified system for monitoring log data, according to a preferred embodiment of present invention. In this figure the system further comprises a parsed data log manager.

Reference is now made to FIG. 5, which depicts another exemplary preferred embodiment of the present invention. The parsing engine 2, the raw log data 4, the parsed data 5 and the pattern repository 3 are as in FIG. 1 above. However, in the present embodiment, a parsed data log manager 41 is added. In the preferred embodiment depicted in FIG. 5, the parsed data log manager 41 is designed to receive the output parsed structured data 5.

The parsed data log manager 41 comprises a log record builder 47. The log record builder 47 receives the parsed structured data 5 from the parsed data builder 1 and, preferably, further information such as the source of the log entry. Based upon the parsed structured data 5 and the additional information the log record builder 47 generates a log record. Every unit of parsed structured data 5 which is received is transformed into a log record which is added to a log report list 42. The log report list 42 comprises an array of sequential log records. Unlike the raw log data 4, the parsed structured data 5 comprises identifiable entries in a unified pattern.

In one preferred embodiment of the present invention a probing window is defined. The probing window contains a fixed number of entries from the log report list 42 at any given moment. Every predetermined time interval the content of the probing window is updated and new entries from the log report list 42 replace the current window's entries. Preferably, the window is displayed using a visual display device 62, such as a conventional PC screen, which is connected to the parsed data log manager 41.

Preferably, the parsed data log manager 41 further comprises a viewing module 46. The viewing module 46 is adapted to transform log records of the log report list 42 to the visual display device 62. Preferably, the viewing module 46 is adapted to output a table, a chart or any graph based upon the log records.

As depicted in FIG. 5, the system further comprises at least one user input device 61. As is generally well known, a common mouse device and a common desktop keyboard can be used as input devices, both connected to a computing unit which controls the display device 62, and can allow users to input search queries and to make selections. Preferably, the user can use input device 61 to configure the viewing module 46 to display the log report list 42 according to different viewing options.

In one preferred embodiment of the present invention the viewing module 46 facilitates the display of entries from different log sources in one merged view. In this preferred embodiment entries of the log report list 42 which originate from different logs are marked with different colors.

In one preferred embodiment of the present invention, the viewing module 46 further comprises a graphic engine (not shown). The graphic engine is utilized to generate a display signal 45 of the virtual display of the data which is sent to the display device 62. There are numerous graphic engines which are able to generate the virtual display of the data in 3-D tables and graphs, such as Truevision, Quake, etc., which are well known in the art.

Since the parsed data builder 1 parses each and every unit of the received raw log data 4 portion it parses, the parsed outputs may comprise data which is not relevant for certain maintenance teams. Hence, filtering the irrelevant entries can clearly simplify the maintenance procedure of scanning a multiplicity of log files. In order to reduce the number of irrelevant entries of the output parsed structured data 5, the log record builder 47 is connected to input device 61 that facilitates the input of filtering instructions 44.

Preferably, the parsed data log manager 41 receives filtering instructions 44 which are transferred to the log record builder 47. Based upon the filtering instructions 44, the log record builder 47 determines which of the records in the log report list 42 should be filtered out and which records should be added to the log report list. For example, filtering instructions 44 may limit the record logs to comprise entries from only certain dates or from only a specific origin of raw log data.

Preferably, the parsed data log manager 41 is connected to a user interface that allows the operator of the system to have the ability to input the filtering instructions 44 via a user interface.

Preferably, the format of the filtering instructions 44 is SQL format. Accordingly, the viewing module 46 further outputs a graphical user interface (GUI) to display device 62 that displays a user input interface such as a string field. The user input interface allows the user to have the ability to input filtering instructions 44 to the parsed data log manager 41, thereby interfacing with the log record builder 47. Thus, the log record builder 47 outputs the log report list 42 based upon the parsed structured data 5, according to the filtering instructions 44.

Figure 6:
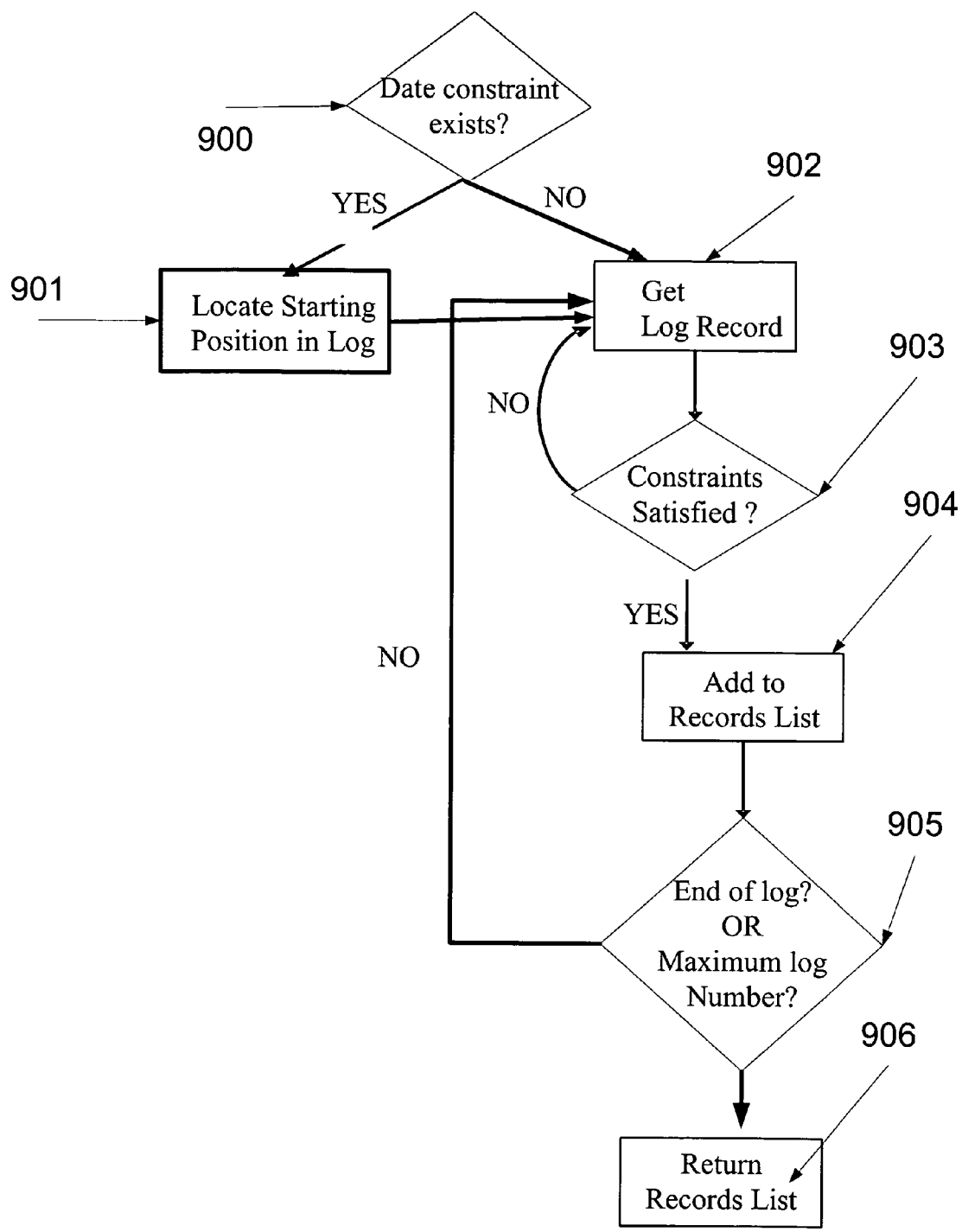
FIG. 6 is a flowchart of a process of filtering which is done by the log record builder, according to one preferred embodiment of the present invention.

Reference is now made to FIG. 6, which is a flowchart that illustrates the process of filtering which is done by the log record builder, according to one preferred embodiment of the present invention.

FIG. 6 depicts the process of filtering log records. In this preferred embodiment the first step 900 is to check whether the filtering instructions comprise a date constraint.

Preferably, the records of the log are arranged according to time and date in a sequential manner.

The next step is to identify the entries that satisfy the date constraint of the filtering instructions, as this may decrease the search time duration, since a binary search can then be used, rather than a linear search. The binary search decreases the complexity of the search from O(n) to O(log n). Thus, if a date constraint exists, as shown at 900, the next step, at 901, is to find the entries that satisfy the date constraint.

The next step is to get the first record, as shown at 902 (either the first or the first to satisfy the date constraint), and to check, as described above, whether the entry satisfies the filtering instructions, as shown at 903. The entries that satisfy the filtering instructions are added to the record list, as shown at 904. In this manner, records are filtered until either the defined number of records to search is achieved, as shown at 905, or until the log has been completely scanned.

After the filtering process is finished the log record builder returns a record list, as shown at 906, which comprises only records that comply with the filtering instructions.

Figure 7:
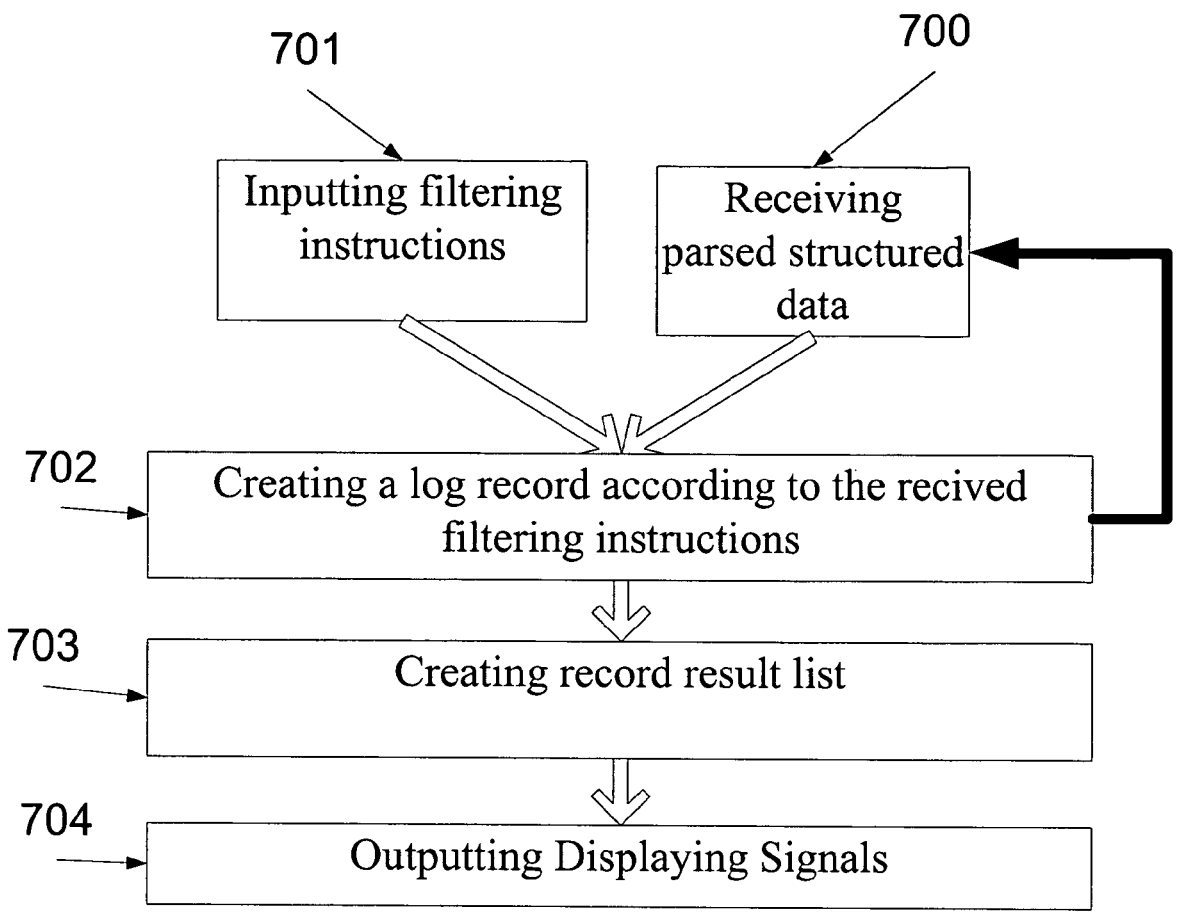
FIG. 7 is a flowchart of a process of displaying parsed structured data to users, according to one preferred embodiment of the present invention.

Reference is now made to FIG. 7, which is a flowchart that illustrates the process of displaying parsed structured data to users, according to one preferred embodiment of the present invention.

As described before, the parsed data log manager receives parsed structured data from the parsed data builder, as shown at 700.

The system operator has the ability to input filtering instructions, as shown at 701. The log record builder creates log records. The log records are created according to the filtering instructions, as shown at 702, based upon the parsed structured data. After finalizing the log record, the log record builder adds it to a record result list.

When the number of the log records added to the list reaches the desired number or when no more raw data is available, the record log builder outputs the records result list, as shown at 703. Based upon the outputted records result list, the viewing model outputs display signals to a display device, as shown at 704.

In one preferred embodiment of the present invention, the system further facilitates the display of data that couldn't be parsed. In this preferred embodiment the parsed structured data further comprise the data that the parsing engine has failed to parse.

Figure 8:
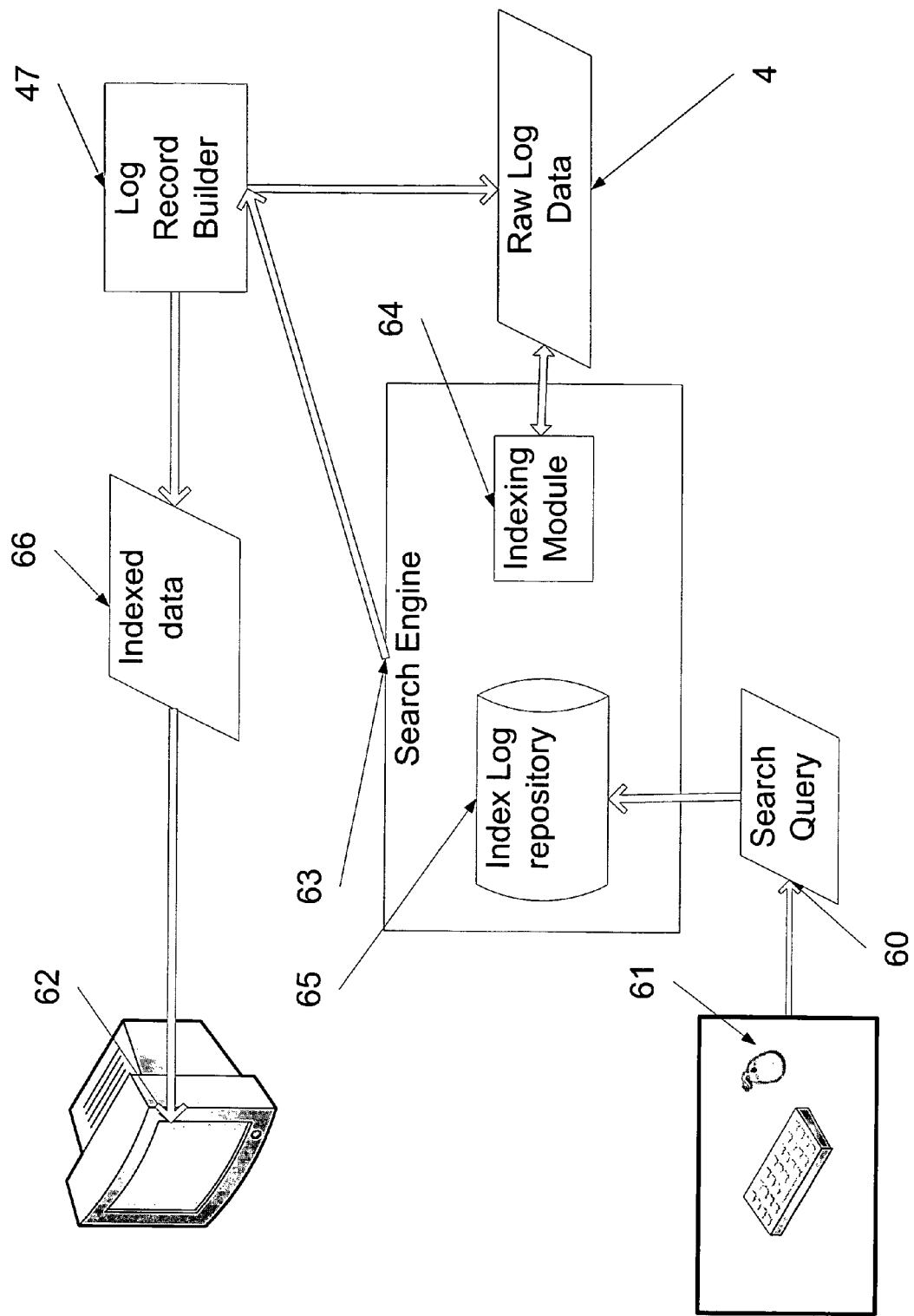
FIG. 8 is a schematic illustration of another simplified search engine for searching log data, according to a preferred embodiment of present invention.

Reference is now made to FIG. 8, which depicts another exemplary preferred embodiment of the present invention. FIG. 8 depicts a search engine 63 which is connected to a source of raw log data 4; a display device 62, such as a conventional PC screen; and a user input device 61, such a common mouse device, a keyboard or a keypad.

As mentioned before, log files can be substantially large. Various distributed computerized systems generate log files of several gigabytes or even several hundreds of gigabytes. Scanning such log files can require a substantial amount of time of the system's maintenance team.

In order to allow maintenance teams to search for specific entries among myriad records in a relatively fast and effortless manner, a search apparatus may be integrated into the log record analyzing and monitoring systems.

FIG. 8 depicts a search engine 63 that facilitates searching for specific entries contained in the raw log data 4. The search engine 63 performs the search according to a search query 60.

The search engine 63 comprises an indexing module 64 and an index log repository 65. The indexing module 64 is designed to accelerate the search operation of the search engine.

In use the indexing module 64 scans the raw log data 4 and creates an index log that comprises a list of terms which are contained in the scanned raw log data 4. The scan is done in a non-intrusive manner. The indexing module process requests only "read only" rights when accessing the log files. By scanning the log files in a non-intrusive manner the file is still open to changes. Hence, the indexing process does not impede or delay the updating of the probed log file. The scanning action does not prevent the computerized system from updating the scanned log file.

Subsequently, the indexing module 64 stores a copy of the new index log in a designated index log repository 65. In addition, the index log stores the position of the probed records. Each term record of the index log stores the position of a corresponding term in the scanned raw log data 4.

Preferably, the indexed data 66 is an indexed log file that comprises the matched entries and a metadata that describes the data in the indexed log file. Log files that comprise the raw log data 4 are designed to reflect the current status of the related computerized system.

In addition, the aforementioned log files are usually being constantly updated to comprise entries which are related to current events and messages of the computerized system. Since the log files are constantly changing, the indexed log files may not reflect the latest information or changes of the probed log file and may not represent accurately the current status or even the current location of the related log file.

Moreover, since the indexing process is relatively long and demands a substantial amount of computing power, re-indexing of the log file is not an efficient solution for maintaining an up-to-date indexed log file. Hence, in order to better reflect the log file, the indexing module 64 updates only the differences in the logs files from the last indexing process or updating process. Preferably, the aforementioned updating process is carried out either every predetermined time interval or according to a change in the log file size.

Another problem is that the names of some log files are changed during their lifespan. For example, names are changed to reflect the sequential creation of the log files (e.g., log1.txt, log2.txt) or the dates and the times the files have been updated (e.g., log_20040231_2100.txt). Moreover, log files may even change their locations in the storage. New folders or sub-folders may be formed during the lifespan of the log file, changing the log file relative and absolute pathname. Hence, in order to ensure correlation between the indexed log file and the related log file, the metadata of the indexed log file is updated with the changes in the log file name and pathname.

After the indexing process has been completed, the search engine 63 may search the output indexed data 66 for entries that match the definitions of a search query.

Figure 9:
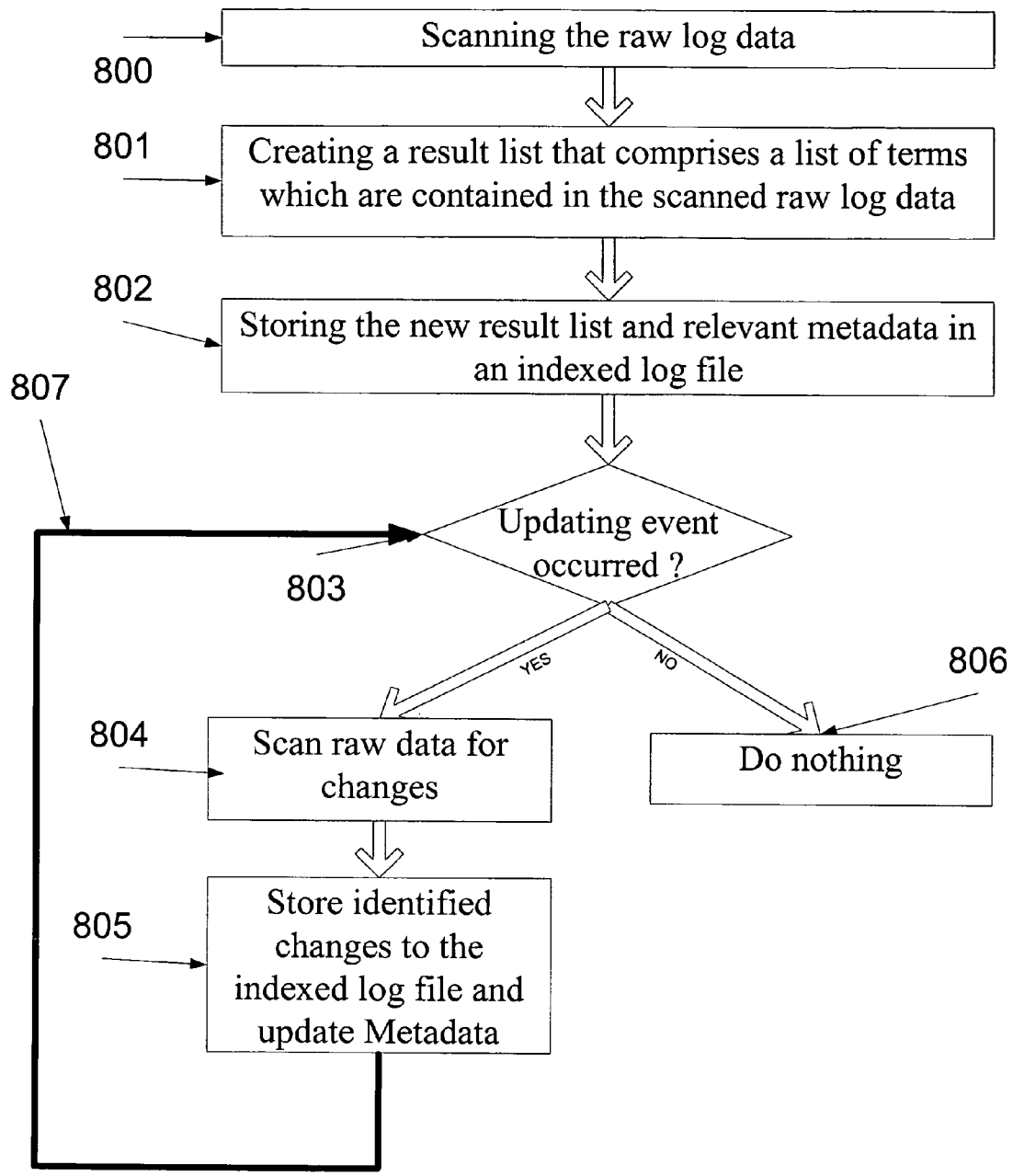
FIG. 9 is a flowchart of an indexing process, according to one preferred embodiment of the present invention.

Reference is now made to FIG. 9, which is a flowchart that describes the indexing process. As described above, the first step is to scan the raw data, as shown at 800. Based upon the raw data, the following step, 801, is to create a result list that comprises a list of terms which are contained in the scanned raw log data. During the next step, 802, the result list is stored in an indexed log file. Metadata that represents the data in the indexed log file is further stored in the indexed log file. At this stage, the search engine can start using the indexed log file for searching specific entries.

In order to keep the indexed log file up-to-date, updating events are defined, as shown at 803.

As described above, the updating events are based upon time intervals or upon structural changes of the raw log data. If nothing has occurred the indexing module is idle, as shown at 806. If an updating event occurred, the indexing module scans the raw data for changes, as shown at 804. The indexing module adds the identified changes to the indexed log file and updates metadata with the change, as shown at 805. Preferably, the indexing module actively updates the indexed log file as described above during the whole lifespan of the raw log data, as shown at 807.

With further reference to FIG. 8, the search engine 63 searches the indexed log file for records which match the search query 60. Subsequently, the indexing module 64 generates a search result record. The search result record comprises references to the actual location of the matching entries in the raw log data 4. The search result record is transferred to the log record builder 47. The log record builder 47 identifies the entries which are listed in the search result record, generating indexed data 66 based thereupon. The indexed data 66 comprises a copy of entries that matched the search query. In order to create such a record result document, the search engine 63 accesses the raw log data 4 and copies entries according to the position records of the log index records that matched the search query.

Since, as described above, the search engine does not scan the raw log data 4 in order to match the search query 60, the indexing module substantially shortens the search time duration.

In order to allow the system operator to have the ability to input a search query 60, display device 62 displays, preferably, a graphical user interface (GUI). The GUI displays a user input interface such as a string field or a scrolling list of words. The user input interface allows the user to have the ability to interface with the search engine 63 and to input and refine the search query 60. Preferably, the search query 60 is in SQL format. The search engine 63 searches for a full or a partial match between the search query 60 and records of the indexed log files, creating the log report list 42 based upon the match.

Preferably, the displayed user input interface may further contain a string field that allows users to input numerical characters. Preferably, the displayed user input interface may contain a string field that allows users to input dates that limit the search of the search engine to a specific range of dates.

Preferably, the indexed log files enables the search engine 63 to use a naive linear search (Complexity $O(n)$) for searching records that match the system operator search query 60.

Preferably, the records of the indexed log file are arranged in trees. This arrangement may decrease the time duration of the search, if the search query 60 comprises a limited range of dates. In this case, the search engine 63 finds the first entry of the indexed log file which comprises a subentry that represents a generating date which is in the requested range. Accordingly, the search engine may automatically consider the records that follow the first entry which are in the requested range as relevant entries. A binary search, which is adapted to search a sorted array by repeatedly dividing the search interval in half, can be used in this case to decrease the complexity of the search from $O(n)$ to $O(\log n)$.

The binary search starts from either the first or the last record. The first step is to check whether the date of the requested record is before the generating date of the middle item, narrowing the search to the lower half. Otherwise the search is narrowed to the upper half. This step is repeated until a date within the requested range is found or until only one undividable record is left.

Figure 10:
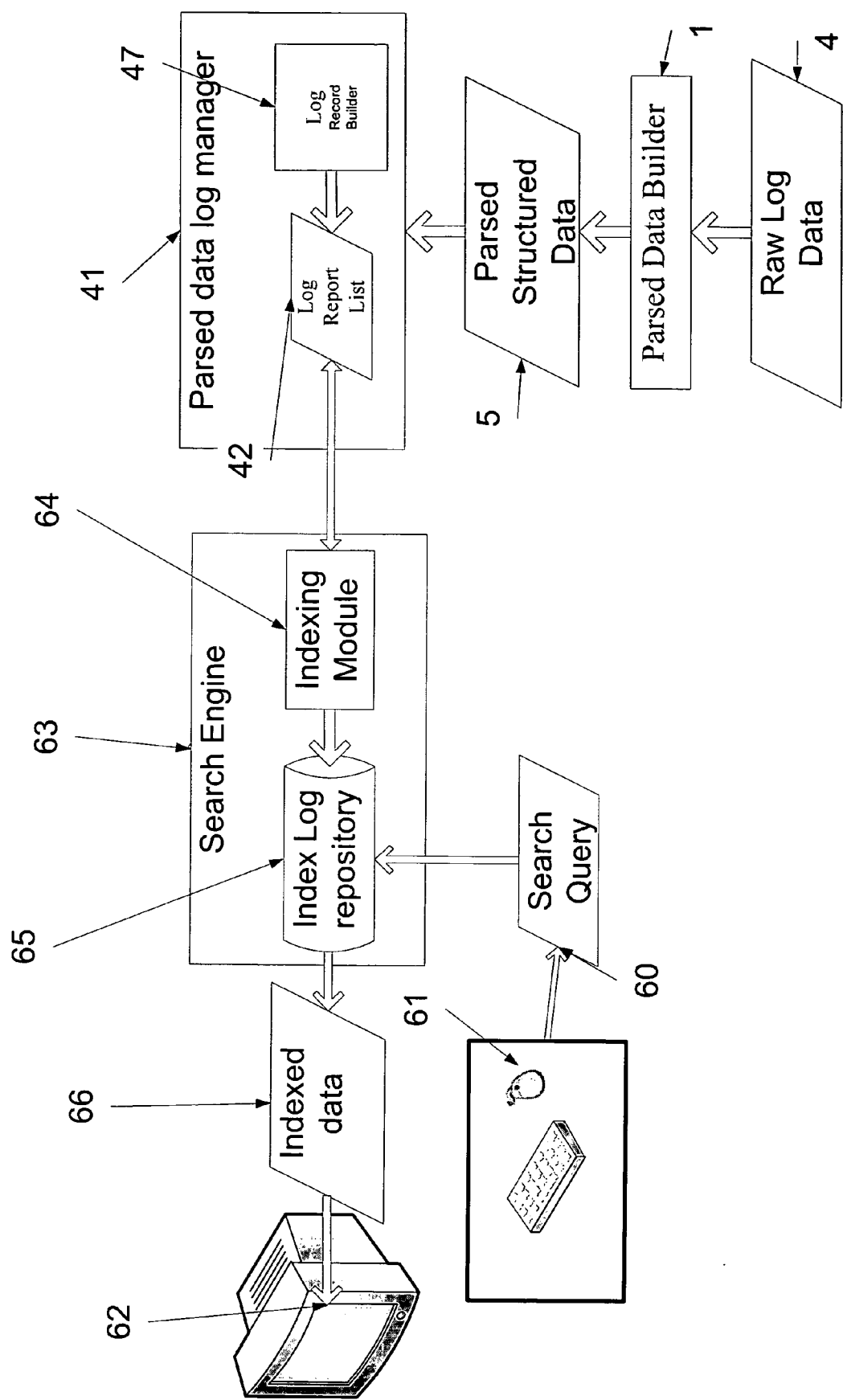
FIG. 10 is a schematic illustration of another simplified system for monitoring log data, according to a preferred embodiment of present invention. In this figure the system further comprises a search engine.

Reference is now made to FIG. 10, which depicts another exemplary preferred embodiment of the present invention. The search engine 63, the display device 62 and the Search query 60 are as in FIG. 8 above. The parsed data log manager 41 and the parsed data builder 1 are as in FIG. 5. However in the preferred embodiment of the present invention which is depicted in FIG. 10, the search engine 63 is connected to the parsed data log manager 41 and not directly to the raw log data 4.

FIG. 8 depicts a preferred embodiment of the present invention that facilitates searching the raw log data 4.

FIG. 5 depicts another preferred embodiment of the present invention that facilitates the parsing of the raw data from semi-structured or unstructured data to structured data.

Parts that are the same as in previous figures are given the same reference numerals and are not described again except as necessary for an understanding of the present issue.

As elaborated above, it is clear that the integration of a searching apparatus with searching abilities can contribute to the management of substantially large log files. Scanning such log files requires a substantial amount of time of the system's maintenance team.

The parsed data builder 1 outputs structured data 5 which is further edited by the parsed data log manager 41 that outputs a log report list 42. As described above, the log report list 42 is structured data which is much easier to comprehend with than raw log data 4.

However, the log report list 42 still may comprise numerous entries. In order to facilitate the analysis of the log report list 42 the search engine 63 which is depicted in FIG. 8 can be used.

FIG. 10 depicts a search engine 63 which is connected to the parsed data manager and has the ability to search along the log report list 42. The log report list 42 is updated constantly with records which are based upon the parsed structured data.

In one preferred embodiment of the present invention a probing window is defined. The probing window contains a fixed number of entries from the log report list at any given moment. Every predetermined time interval the content of the probing window is updated and new entries from the log report list 42 replace the current window's entries.

The window's entries are constantly transferred to the indexing module 64. The indexing module 64 indexes the window's entries and outputs based upon indexed log data. The indexed log data is stored in the index log repository 65 as a designated indexed log file.

After the probing window is updated the starting location of the log is determined and another batch of entries is transferred and indexed in the same manner. The indexed data is stored in the same indexed log file.

Reference is now made to FIG. 1, which depicts another exemplary preferred embodiment of the present invention. The parsing engine 2, the parsed structured data 5 and the pattern repository 3 are as in FIG. 1 above. However, the present embodiment further comprises an automatic pattern recognition module 21.

The log record analyzing system is designed to communicate with existing computerized systems. The parsed data builder 1 is designed to receive raw log data 4 from different computerized systems. The pattern repository 3 comprises storage of different types of grammar patterns. However, it is clear that no matter how comprehensive the pattern repository 3, new types of log data with new and unpredicted grammar can appear.

In addition, the logging data module of the computerized systems that produce analyzed raw log can be updated. The logging data module produces the raw log data according to predetermined grammar rules. Clearly, the records of the pattern repository 3 may document only predetermined grammar types which are defined before the pattern repository has been finalized. If the grammar of the logging data module is updated, the pattern of the raw log data 4 may be changed accordingly. Hence, if the grammar which is used by the logging data module is updated, the parsing engine 2 may fail to match raw log data 4 which has been generated according to the updated grammar with records of the pattern repository 3.

In this preferred embodiment of the present invention, an automatic pattern recognition module 21 is added to the parsed data builder 1. This embodiment facilitates the identification of new patterns that have a grammar type which is not fully recorded or represented in the pattern repository 3.

In this embodiment, a subset 20 of the raw log data is extracted from the raw log data 4 and transmitted to the automatic pattern recognition module 21. The transmitted subset 20 comprises a number of different entries that represent the grammar types of the raw log data 4. The automatic pattern recognition module 21 scans the subset's entries and identifies the grammar type of the raw log data 20.

Preferably, the automatic pattern recognition module 21 is connected to a user interface unit (not shown). In this preferred embodiment the automatic pattern recognition module 21 allows the system operator to have the ability to participate in the procedure of generating a pattern object.

Preferably, the scan of the pattern recognition module is automatically divided into a few steps.

Figure 12:
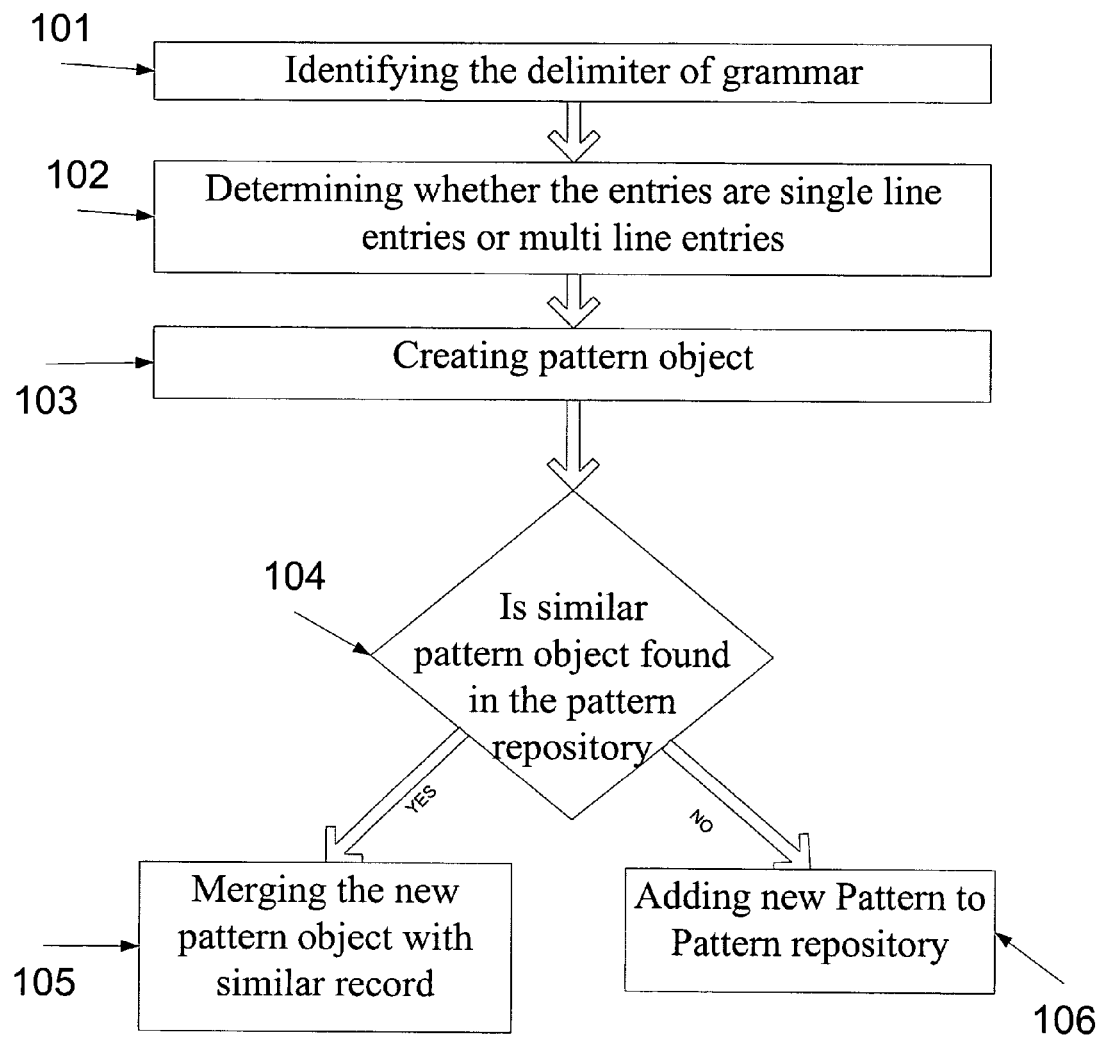
FIG. 12 is a flowchart of an automatic pattern recognition process, according to one preferred embodiment of the present invention.

Reference is now made to FIG. 12, which is a flowchart of an exemplary series of steps preformed by the automatic pattern recognition module to create a new pattern object.

At the beginning of the process, the automatic pattern recognition module 21 (FIG. 11) identifies the characters or the sequence of characters that marks the beginning and the ending of each entry in the raw log data subset 20 and stores them, as shown at 101. The characters that mark the beginning and the ending of each entry may be referred to here as the delimiters of a certain grammar. Accordingly, during step 102, the automatic pattern recognition module determines whether the entries are single line entries or multi-line entries.

Subsequently, also during step 102, the automatic pattern recognition module tokenizes the different kind of entries according to the delimiter which has been identified in the previous steps. During the tokenization, the automatic pattern recognition module splits up strings of characters from the raw log data into sets of blocks of structured text.

The tokenization is preferably done by converting strings from the probed raw log data to a predefined sequence of characters. Preferably, the probed subset of raw log data is converted into another format that is much smaller.

Each predefined sequence is associated with: the word it identifies, a unique identifier that indicates the relative position of the word in the log, the relative position of the sentence containing the word, and the relative position of the paragraph containing the word.

In one preferred embodiment of the present invention, a prefix tree is created during the tokenization process. Based upon the probed subset of raw log data, a pattern list is created. The pattern list records are processed to create a prefix tree. Each node of the prefix tree contains string values and the string value of a parent node. Each node comprises several characters based upon the grammar of the subsets of raw log data. The tokenization procedure is generally well known and therefore is not being described here in greater detail.

Preferably, at this stage, the automatic pattern recognition module allows the system operator to have the ability to participate in the procedure of generating a pattern object, as shown at 103. Via a user interface unit, the pattern list is displayed to the user. The user can use the user interface unit to edit the displayed pattern list. In this manner the user can improve the accuracy of the pattern grammar. In step 103, the tokenized entries are processed to create a new pattern object that comprises an array of regular expressions.

Preferably, after the new pattern object has been created, the automatic pattern recognition module rescans the new pattern object and removes pattern entries which rarely appeared in the probed raw log data.

Figure 11:
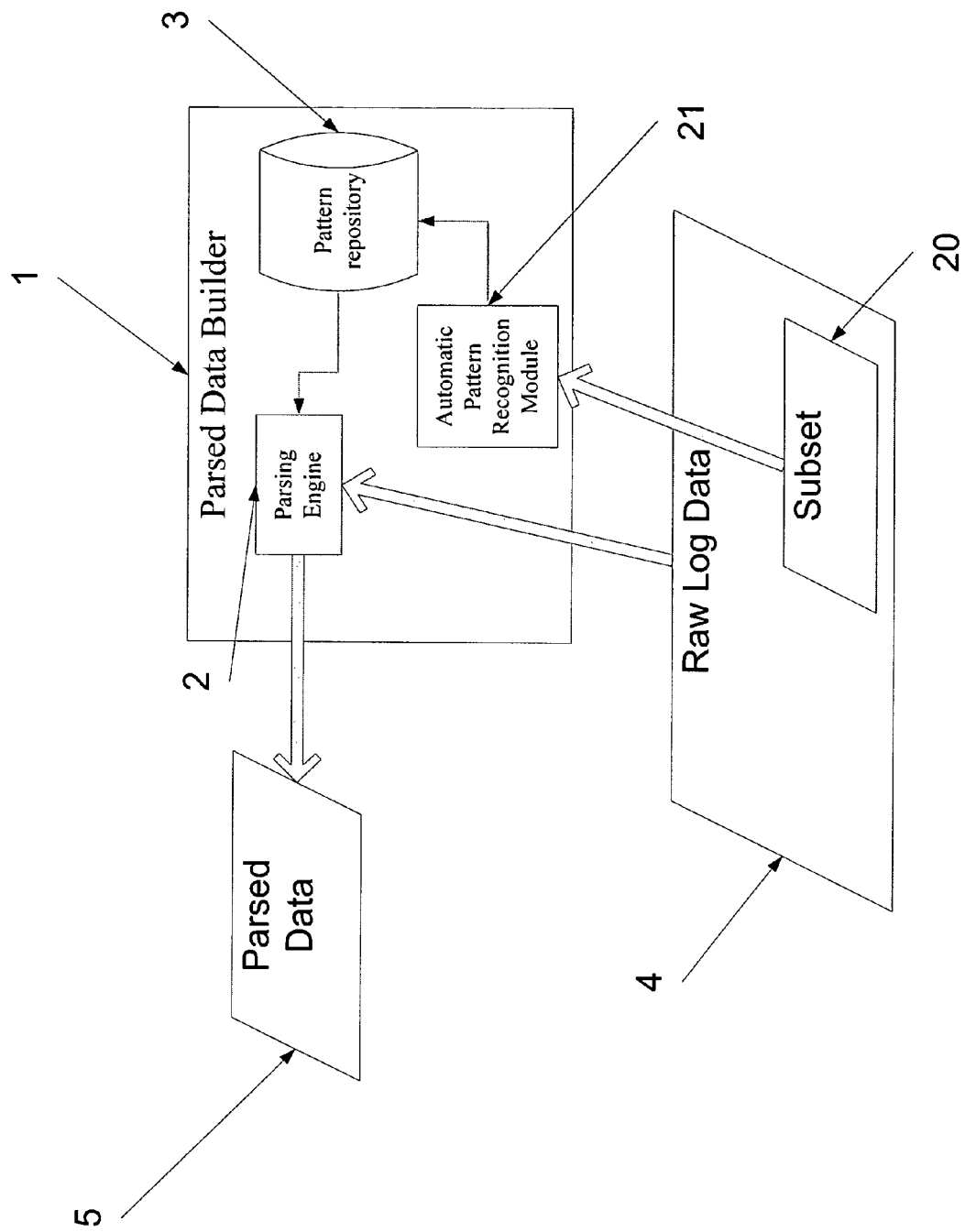
FIG. 11 is a schematic illustration of another simplified system for monitoring log data, according to a preferred embodiment of present invention. In this figure the system further comprises an automatic pattern recognition module.

In the following step 104, the created pattern object is then compared with the records of the pattern repository 3 (FIG. 11). If a similar pattern is found among the records then, at step 105, the new pattern object is merged into the record with the similar pattern to create a record with more elaborate documentation of the pattern's grammar. If no similar record is found then, at step 106, the pattern object is added to the pattern repository as a separate record.

Reference in now made, once again, to FIG. 11. As depicted above, the parsed data builder 1 outputs parsed data 5. Preferably, the output parsed data 5 is edited as a record that holds an array of objects of the parsed log entry and further associated information such as the title of the origin of raw log data 4.

Figure 13:
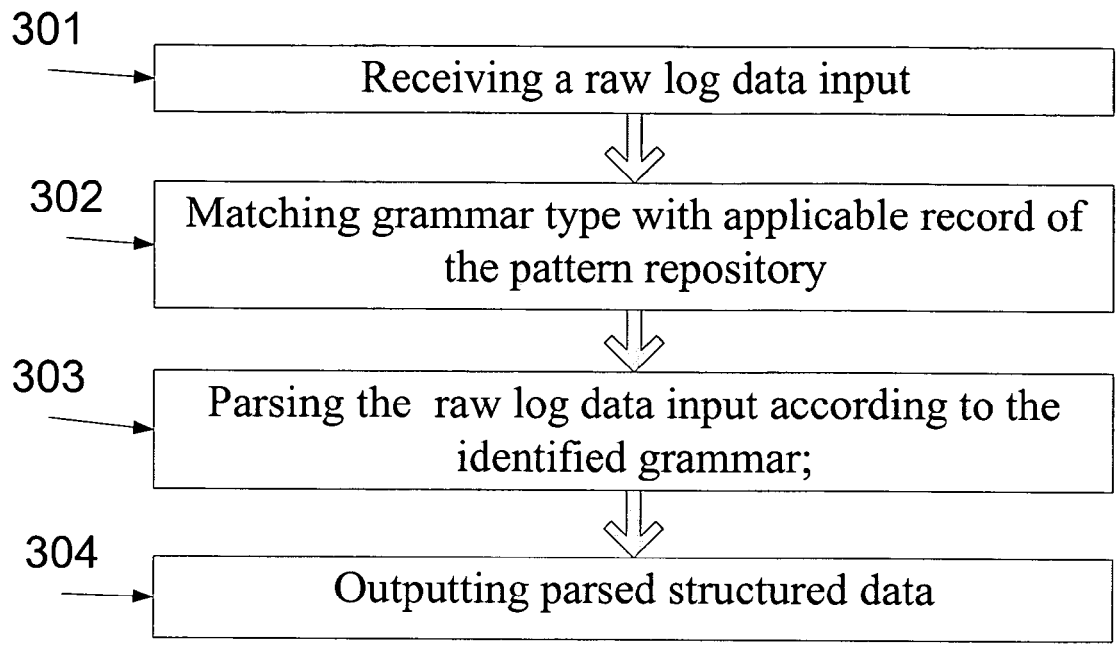
FIG. 13 is a flowchart of a process for monitoring computerized systems, according to one preferred embodiment of the present invention.

Reference is now made to FIG. 13, which is a flowchart of an exemplary method for monitoring computerized systems, according to one preferred embodiment of the present invention.

As depicted in FIG. 13, a parsing engine which is adapted to receive raw log data input and a pattern repository that comprises several different grammar types are used. As depicted in FIG. 13 during the first step 301, the parsing engine receives a block of raw log data input. The raw log data input may originate from different kinds of computerized systems. Following the reception of the raw log data, at step 302, the parsing engine matches the grammar type of the raw log data input with a record of the pattern repository. After matching the raw log data with one of the records, at step 303, the parsing engine parses the raw log data input according to the grammar which is stored in the matched record. During the next step 304, based upon the matched grammar, the system outputs parsed structured data.

It is expected that during the life of this patent many relevant devices and systems will be developed and the scope of the terms herein, particularly of the terms computerized system, log files, logs, log records, memory and communication network are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art.

Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A log record analyzing system for monitoring log records from external computerized systems, the external computerized systems using respectively initially undefined grammar types for log records, said log record analyzing system comprising:

a processor, the processor being hardware and configured with:

a pattern repository configured to store a plurality of pattern object records, each of said stored pattern object records being of a respectively different log record grammar type, thereby to provide within said system a plurality of defined grammar types, incoming log records being matchable with said pattern records to find a matching structure, thereby to parse said incoming log records of undefined grammar type according to respectively matched structures, said matching thereby defining grammar types for parsing of said incoming log records; and a parsing engine associated with said electronic pattern repository, comprising:

a raw log data input for receiving raw log data from said computerized system, said raw log data being of said undefined grammar type, a matching unit associated with said input for matching between said raw log data input and successive ones of said pattern object records to find one of said pattern object records having a structure most closely matching said raw log data irrespective of said matching being an exact match, selecting said pattern object record having said most closely matching structure and parsing said raw log data of undefined grammar type using said selected pattern object record and said matching structure to produce a parsed structured version of said raw log data of initially undefined grammar type; and an output for outputting said parsed structured version of said raw log data of initially undefined grammar type, said parsed structured version thereby being rendered suitable for said monitoring, said closest matching being to ensure that said parsed structured version is provided and said monitoring enabled even when no exactly matching pattern object record is found, the system further comprising an automatic parsed data builder configured to identify the grammar of said raw log data input, said automatic parsed data builder being configured to output a pattern object according to said identified grammar, storing said pattern object in said pattern repository.

2. The log record analyzing system of claim 1, wherein said raw log data input consists of at least one of the following members: textual log files, XML files, database files, communication information unit carriages, Java Message Service (JMS) packet files, and Enterprise Application Integration (EAI) packet files.

3. The log record analyzing system of claim 1, wherein said raw log data input consists of at least one of the following data types: semi-structured data, unstructured data, and structured data.

4. The log record analyzing system of claim 1, wherein said raw log data comprises at least one of the following entries: multiple line entry and single line entry.

5. The log record analyzing system of claim 1, wherein said raw log data input comprises a plurality of grammar types.

6. The log record analyzing system of claim 1, further comprising a Complex Event Processing (CEP) module configured to receive said raw log data from at least one computerized system, said CEP module being configured to forward said received raw log data to said parsing engine, wherein said forwarding is done according to a set of predetermined rules.

7. The log record analyzing system of claim 6, wherein said CEP module is configured to be connected to a transaction database operative for storing said raw log data, wherein said CEP module is configured to further transmit said received raw log data to said transaction database.

8. The log record analyzing system of claim 6, wherein said CEP module is configured to be connected to a user interface device, wherein said user interface device is configured to transmit said set of predetermined rules to said CEP module.

9. The log record analyzing system of claim 6, wherein said set of predetermined rules comprises at least one of the following rules: static rule, dynamic rule, deterministic rule, statistical rule, event driven rule, and time and date based rule.

10. The log record analyzing system of claim 6, wherein said set of predetermined rules comprises a rule that requires the existence of a predefined pattern in said raw log data.

11. The log record analyzing system of claim 1, wherein said parsed structured data is a list containing at least one array of objects, wherein said objects comprise parsed raw log data.

12. The log record analyzing system of claim 1, further comprising a parsed data viewer, wherein said parsed data viewer is configured to receive said parsed data and wherein said viewer is adapted to graphically display said received parsed data.

13. The log record analyzing system of claim 1, further comprising a log record builder, wherein said log record builder is configured to receive said parsed structured data; wherein said log record builder is configured to output at least one resultant log record according to a set of predetermined rules, said output being based upon said raw log data input and said parsed structured data.

14. The log record analyzing system of claim 13, wherein said log record builder is configured to be connected to a user interface device, said user interface device operable for transmitting said set of predetermined rules to said log record builder.

15. The log record analyzing system of claim 13, further comprising a log record viewer operative to display said at least one resultant log record.

16. The log record analyzing system of claim 13, further comprising an indexing module, said indexing module configured to receive said at least one resultant log record, and, based thereupon, to output at least one indexed resultant log record.

17. The log record analyzing system of claim 16, further comprising a search module, wherein said search module is configured to search said at least one indexed resultant log record according to at least one search definition, said search module being configured to output a matching list consisting of at least one of said resultant log records.

18. The log record analyzing system of claim 17, further comprising a user interface, said user interface facilitating the input of said at least one search definition.

* * * * *